3,261,102
EXTENSIBLE RULE
Victor S. Stedman, 6 Blair St., Worcester, Mass.
Filed June 16, 1964, Ser. No. 375,584
3 Claims. (Cl. 33—161)

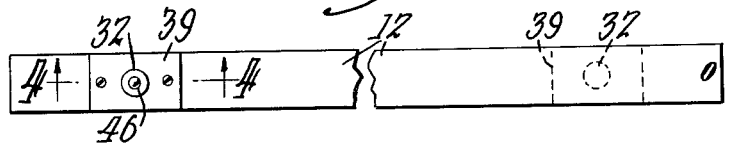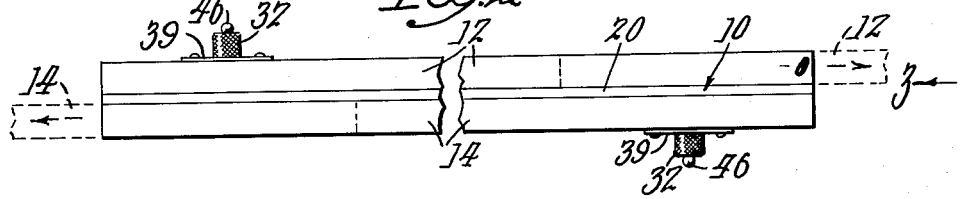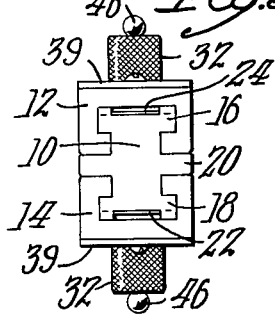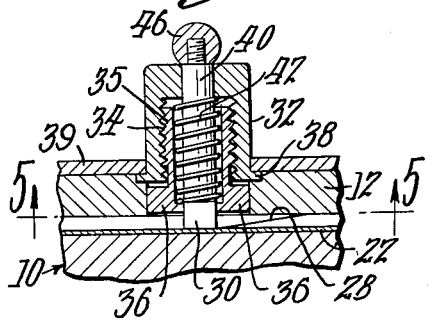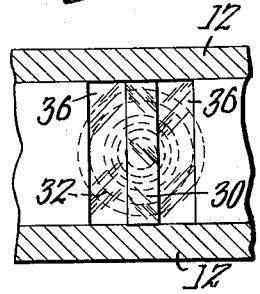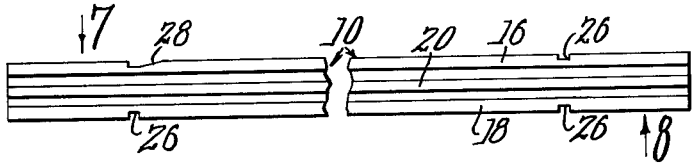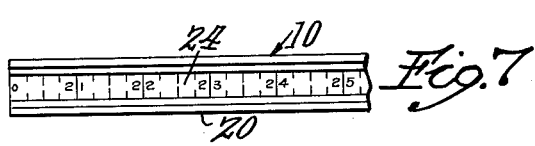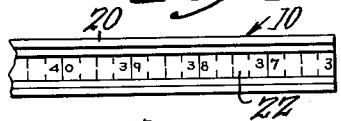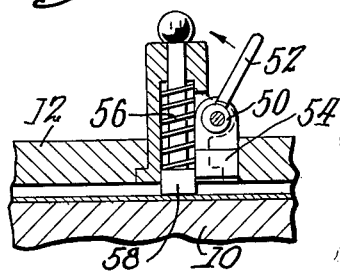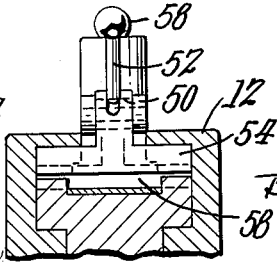

This invention relates to an extensible rule the purpose of which is to provide accurate measurement between two points inasmuch as the rule is rigid and extensible so that the two ends thereof can be used for accurate measuring particularly in inside measurements such as window-frames.

The new rule may be made of wood, aluminum, plastic, or any other suitable material, and comprises three lengths, a core base member and two slide members associated therewith. The rule can be collapsed to the length of the core member and either or both of the slides can be released and extended to provide measurements greater than the length of the core. The slide members extend to opposite ends of the core member and the parts are quickly and easily adjusted to the length of the distance desired and are provided with releasable locking means to hold them in any extended condition desired. Thus the measurement may be made and the extensible rule then taken to the point where the measurement is to be made use of, so that there can be no changes or mistakes, and the operator cannot forget what the measurement was.

Other objects and advantages of the invention will appear hereinafter.

Reference is to be had to the accompanying drawings in which:

FIG. 1 is a plan view showing the extensible rule;

FIG. 2 is a view in side elevation thereof;

FIG. 3 is an end view looking in the direction of arrow 3 in FIG. 2, this view being on an enlarged scale;

FIG. 4 is an enlarged section on line 4—4 of FIG. 1;

FIG. 5 is a section on line 5—5 of FIG. 4;

FIG. 6 is a view in side elevation of the main body portion of the device;

FIGS. 7 and 8 illustrate the indicia which appears exclusively on the central main portion of the device;

FIGS. 9 and 10 are sectional views illustrating a modification of the rule clamping means, and FIG. 11 is a view similar to FIG. 4 showing a modification.

In illustrating the invention, the same has been shown as comprising three main parts. There is a core or main portion 10, a subsidiary sliding member 12, and a similar but reversed complementary sliding member 14. The core member 10 is provided with a pair of parallel grooves along each side thereof, these grooves providing a head 16 at one side, a head 18 at the opposite side, and a central extended longitudinal projection 20, 20 at the edges, see particularly FIG. 3.

As indicated in FIG. 2, either part 12 or part 14 or both can be moved in the directions of the arrows in FIG. 2 to an extended condition showing the maximum measurement, or they can be folded or collapsed into alignment with the ends of the member 10 for the minimum measurement, and of course it is to be understood that these members may be as long as may be desired or convenient. It is preferable that they should be made in several different sizes as for instance rules of ten inches, twenty inches and fifty inches. The ten inch rule will expand to a maximum of twenty-six inches; the twenty inch rule will expand to fifty-four inches; and the fifty inch rule will expand to one hundred and forty-two inches.

Each surface on the center core in the heads 16 and 18 are provided with measurements or markings in increments, these being indicated at 22 and 24. Referring now to FIG. 7 it will be seen that there is a zero indication at 26. When the member for instance 12 is moved to the right as in FIG. 2, so that the numeral 21 is exposed, the total length of the device will be twenty-one inches. When the member 12 is moved further to the right, it will provide for a greater measurement as twenty-two, twenty-three, etc. Therefore it is seen that in the illustration given, the length of the device as shown in FIG. 1 is twenty inches and that is the minimum that it can measure but with slide 12 extended, it measures thirty-six inches. However the slide 14 can be moved to the left and will start uncovering the numeral starting at thirty-six. In other words, with the member 12 fully extended but with member 14 housed in the FIG. 1 position, the length of the rule is thirty-six inches; upon extending the element 14, the total length goes from thirty-six inches inwardly to fifty-four.

Referring now to FIG. 6, it will be seen that the core is provided with notches as for instance at 26, 26, etc., and if desired the notch can have a cam surface as at 28. Cooperating with these notches there are provided spring latches 30, 30, one on each of the sliding members 12 and 14 for engagement with the notches 26 or 28, holding the parts releasably in the FIG. 1 position.

Referring now to FIG. 4, it will be seen that there is a thimble 32 interiorly threaded and acting as a captive nut with respect to the threads 34 which are on the member 35 that extends in through the respective sliding member 12 or 14 and itself terminates in a locking head 36. The nut 32 has an external flange 38 by which it is held in position by a plate 39 which is attached to the members 12 and 14, and when it is turned, the member 35 is translated in and out, or up and down, so that the head 36 is clamped with respect to the center core member 10, and thus the degree of extension of the rule can be held as long as desired. However, upon retracting the nut and releasing the parts, the same are free to slide, but the plunger 40, which is spring biased by spring 42, extends into the notches 26, and the members are held in the FIG. 1 position. If a cam surface such as 28 is used, then the slide can go in one direction but not the other without manually releasing the plungers as by means of the knobs 46.

The scales at 22 and 24 can be inset as is shown in FIG. 3 so that the locking head 36 bears against the material of the heads 16 and 18 rather than directly on the scales.

The plungers may also be operated against the action of the springs by the use of cam rolls as is shown in FIGS. 9 and 10. The cam roll is shown at 50 and has an operating handle 52. When this handle is moved in the direction of the arrow in FIG. 9, it carries the locking member 54 downwardly. When the handle however is released, the spring pressure of spring 56, which also holds locking plunger 58 normally downwardly, is released to move the latching member 54 upwardly and this provides for a quick action of the locking members rather than the relatively slow action which is obtained by turning nut 30.

Referring now to FIG. 11, the construction here is substantially the same as that shown in FIG. 4 but the exposed portion of the nut as at 60 will be seen to be less in height and the same is true of the knob 62 which is comparable to that at 46. By this means the outward extent of the nut 32 in FIG. 4 is considerably reduced and this is particularly advantageous in getting into small or flat, narrow areas.

Having thus described my invention and the advantages thereof, I do not wish to be limited to the details herein disclosed, otherwise than as set forth in the claims, but what I claim is:

1. An extensible rule comprising a central longitudinal core portion having a slide guide adjacent opposite faces thereof, a sliding member engaged in each slide guide, scales arranged at the faces of said central core portion, said scales normally being covered by said slide members when they are in fully retracted position as respects the central core portion, and being uncovered as either or both of said sliding members is moved in a certain predetermined direction, one of said scales reading from left to right and the other scale reading from right to left, a spring-pressed latch on each sliding member and a cooperating notch at opposite sides and opposite ends of said central core portion, the latches entering said notches to hold the three parts in aligned minimum length condition, and means for manually retracting the latches against the action of the springs.

2. The extensible rule recited in claim 1 wherein said latches each comprise a threaded member and an exposed nut engaged therewith, means holding each nut against axial motion, said nuts upon being rotated forcing the threaded member into frictional engagement with said central core portion.

3. The extensible rule recited in claim 1 wherein the latches hold the sliding parts frictionally in desired position with relation to the respective central core, each latch comprising an axially movable member, and cam means for moving the axially movable member into frictional engagement with the central core.

References Cited by the Examiner

UNITED STATES PATENTS

| | | | |
|---|---|---|---|
| 144,264 | 11/1873 | Discher | 33—161 X |
| 650,136 | 5/1900 | Runnette | 33—137 |
| 844,536 | 2/1907 | Prindle | 33—161 |
| 1,349,349 | 8/1920 | Thiman | 33—106 |
| 1,488,482 | 4/1924 | Eckman | 33—106 |
| 2,232,824 | 2/1941 | Maher | 33—106 |
| 2,507,056 | 5/1950 | Smith | 33—161 X |
| 3,094,787 | 6/1963 | Moore | 33—161 |

LEONARD FORMAN, *Primary Examiner.*

ROBERT B. HULL, *Examiner.*

W. D. MARTIN, *Assistant Examiner.*